United States Patent
Ni et al.

(10) Patent No.: US 7,649,743 B2
(45) Date of Patent: Jan. 19, 2010

(54) OPEN-FRAME SOLID-STATE DRIVE HOUSING WITH INTRINSIC GROUNDING TO PROTECT EXPOSED CHIPS

(75) Inventors: Jim Chin-Nan Ni, San Jose, CA (US);
Charles C. Lee, Cupertino, CA (US);
Frank Yu, Palo Alto, CA (US);
Abraham C. Ma, Fremont, CA (US);
Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 147 days.

(21) Appl. No.: 12/043,398

(22) Filed: Mar. 6, 2008

(65) Prior Publication Data

US 2008/0198545 A1    Aug. 21, 2008

Related U.S. Application Data

(63) Continuation-in-part of application No. 12/035,318, filed on Feb. 21, 2008, and a continuation-in-part of application No. 12/033,851, filed on Feb. 19, 2008, and a continuation-in-part of application No. 11/683,292, filed on Mar. 7, 2007, now Pat. No. 7,576,990, and a continuation-in-part of application No. 11/624,667, filed on Jan. 18, 2007, and a continuation-in-part of application No. 11/309,847, filed on Oct. 12, 2006, now Pat. No. 7,507,119, and a continuation-in-part of application No. 11/309,843, filed on Oct. 11, 2006, a continuation-in-part of application No. 10/882,539, filed on Jun. 30, 2004, now Pat. No. 7,394,661, and a continuation-in-part of application No. 10/803,597, filed on Mar. 17, 2004, now Pat. No. 7,457,897, and a continuation-in-part of application No. 09/478,720, filed on Jan. 6, 2000, now Pat. No. 7,257,714, and a continuation-in-part of application No. 09/366,976, filed on Aug. 4, 1999, now Pat. No. 6,547,130.

(51) Int. Cl.
*H05K 5/00* (2006.01)
(52) U.S. Cl. ................ 361/752; 361/737; 361/727
(58) Field of Classification Search ........... 361/752, 361/737, 727, 790, 730, 741, 685; 439/55, 439/65–66, 76.1, 620
See application file for complete search history.

(56) References Cited

U.S. PATENT DOCUMENTS

| | | | |
|---|---|---|---|
| 5,710,693 A * | 1/1998 | Tsukada et al. | 361/679.32 |
| 6,256,878 B1 * | 7/2001 | Keane | 29/841 |
| 6,493,233 B1 | 12/2002 | De Lorenzo et al. | |
| 6,527,188 B1 * | 3/2003 | Shobara et al. | 235/486 |
| 6,570,772 B2 * | 5/2003 | Kawano et al. | 361/752 |
| 7,034,223 B2 | 4/2006 | Fan et al. | |
| 7,113,392 B2 | 9/2006 | Lu et al. | |
| 2005/0164532 A1 | 7/2005 | Ni et al. | |
| 2006/0041783 A1 | 2/2006 | Rabinovitz | |
| 2006/0228910 A1 | 10/2006 | Nishizawa et al. | |

* cited by examiner

*Primary Examiner*—Hung S Bui
(74) *Attorney, Agent, or Firm*—Stuart T. Auvinen; g Patent LLC

(57) ABSTRACT

An open-frame flash-memory drive has a printed-circuit board assembly (PCBA) with flash-memory chips, a controller chip, and a Serial AT-Attachment (SATA) connector soldered to it. The PCBA is only partially encased by left and right frames or by a U-shaped bracket frame. The frames have PCBA supports and guide posts that fit near edges of the PCBA. The frames do not cover the top and bottom of the PCBA, allowing chips on the PCBA to be ventilated by unblocked air flow. Screws that attach the PCBA to the frame have metal collars that ground the frame to the PCBA's ground plane. The screws form a current path to draw any electro-static-discharge (ESD) current off the frame and onto a PCBA ground. When the SATA connector is inserted into a host, the host ground sinks ESD currents collected by the open frame.

2-PIECE BRACKET WITH SCREWS

20 Claims, 10 Drawing Sheets

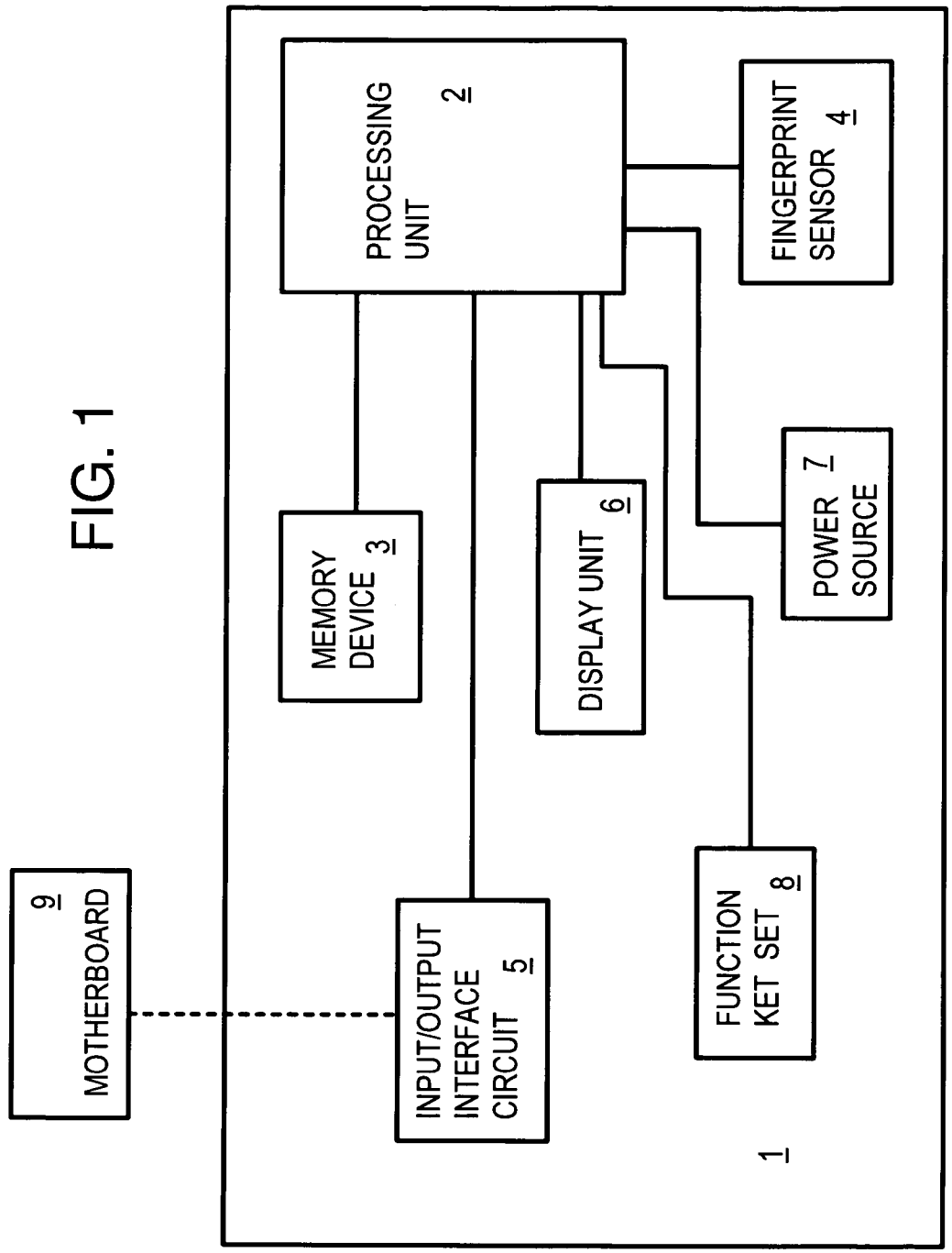

2-PIECE BRACKET WITH SCREWS
FIG. 2B
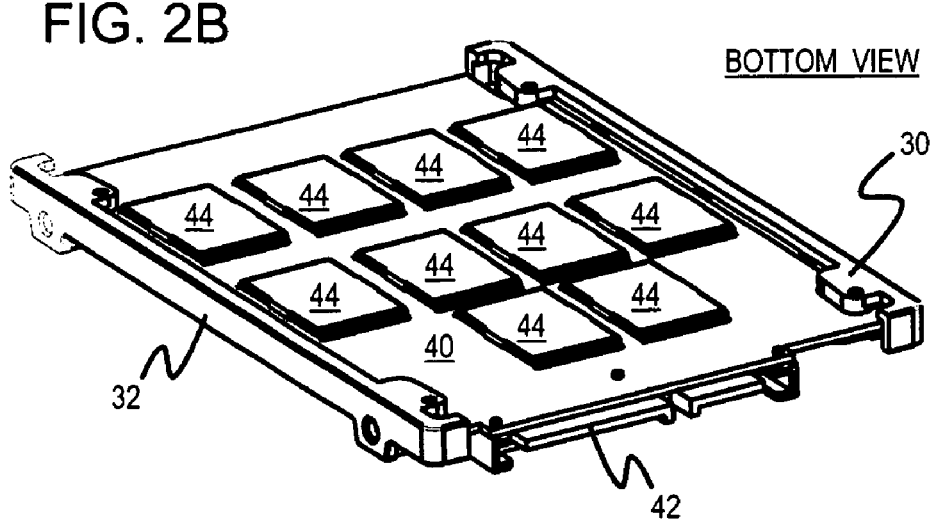
BOTTOM VIEW
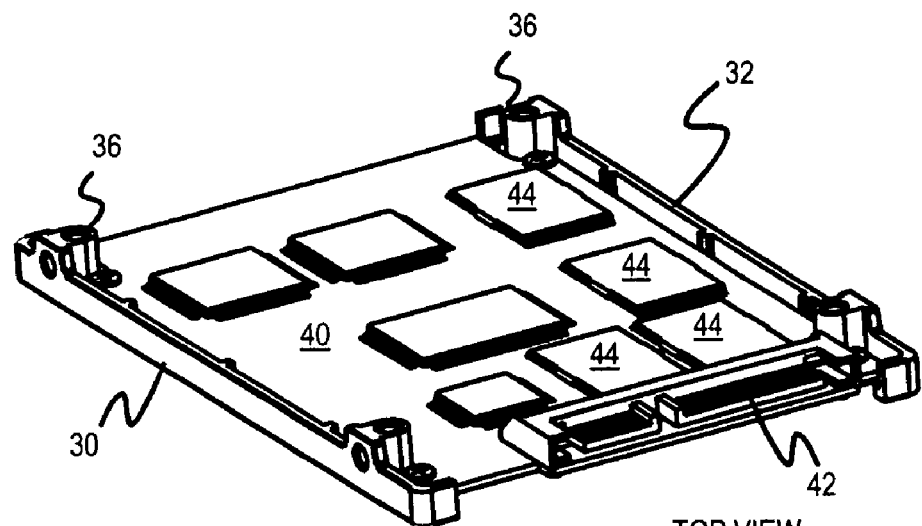
FIG. 2C
TOP VIEW

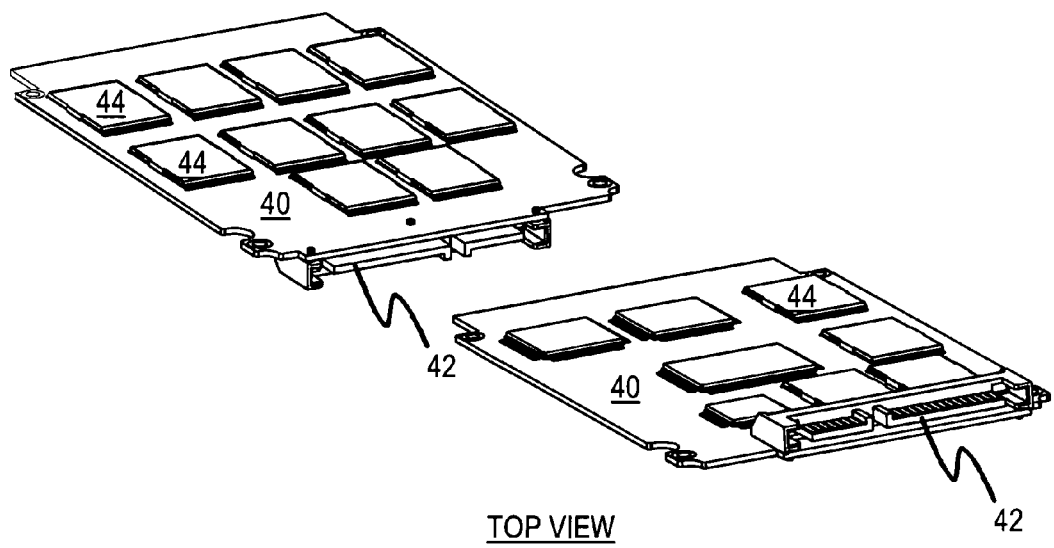

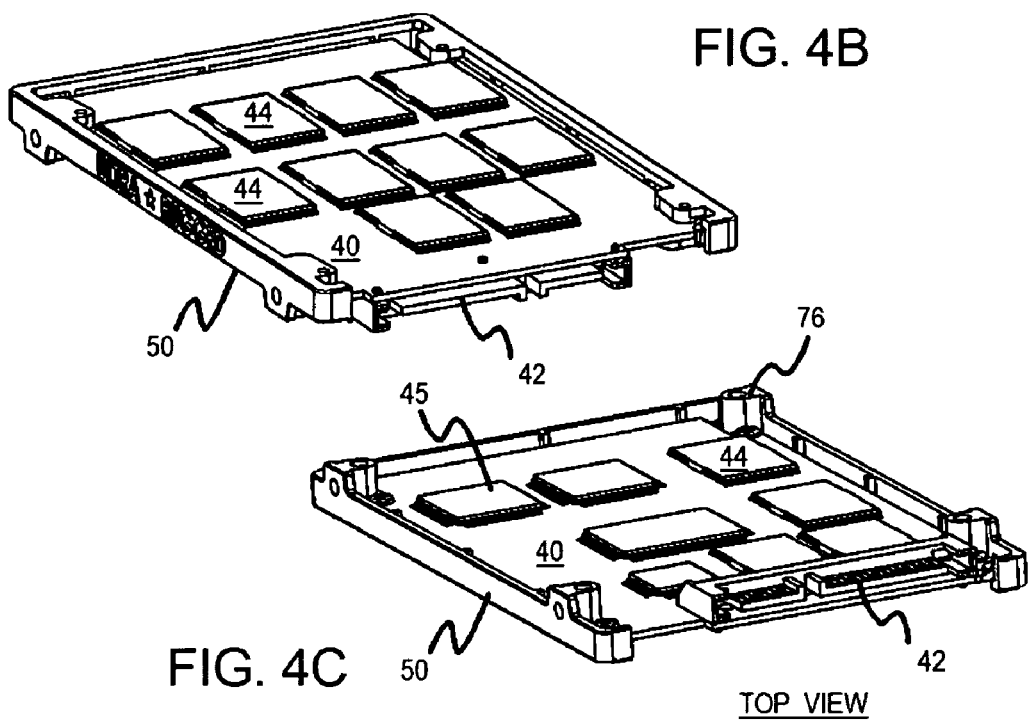

OPEN-FRAME SOLID-STATE DRIVE HOUSING WITH INTRINSIC GROUNDING TO PROTECT EXPOSED CHIPS

RELATED APPLICATION

This application is also a CIP of the U.S. Patent application for "Thin Hard Drive with 2-Piece-Casing and Ground Pin Standoff to Reduce ESD Damage to Stacked PCBA's", U.S. Ser. No. 11/683,292, filed Mar. 7, 2007, and "Thin Flash-Hard-Drive with Two-Piece Casing", U.S. Ser. No. 11/309,843, filed Oct. 11, 2006.

This application is a CIP of the U.S. Patent application for "System and Method Providing a Flash Memory Assembly", Ser. No. 10/882,539, filed Jun. 30, 2004, which is also a CIP of "USB Device with Integrated USB Plug with USB-Structure Supporter Inside", Ser. No. 11/309,847, filed Oct. 12, 2006.

This application is also a CIP of the U.S. Patent application for "PCI Express-Compatible Controller and Interface for Flash Memory", Ser. No. 10/803,597, filed Mar. 17, 2004.

This application is also a CIP of the U.S. Patent application for "Manufacturing Method for Micro-SD Memory Card", Ser. No. 12/033,851, filed Feb. 19, 2008. This application is also a CIP of the U.S. Patent application for "High Endurance Non-Volatile Memory Device", Ser. No. 12/035,318, filed Feb. 21, 2008.

This application is also a CIP of the co-pending U.S. Patent application for "Electronic Data Storage Medium with Fingerprint Verification Capability", Ser. No. 11/624,667, filed on Jan. 18, 2007, which is a divisional application of U.S. patent application Ser. No. 09/478,720, filed on Jan. 6, 2000, now U.S. Pat. No. 7,257,714 issued on Aug. 14, 2007, which has been petitioned to claim the benefit of CIP status of one of inventor's earlier U.S. Patent Application for "Integrated Circuit Card with Fingerprint Verification Capability", Ser. No. 09/366,976, filed on Aug. 4, 1999, now issued as U.S. Pat. No. 6,547,130.

FIELD OF THE INVENTION

This invention relates flash-memory hard drives, and more particularly to manufacturing a flash drive with an open-frame housing.

BACKGROUND OF THE INVENTION

Data files stored on a floppy disk or diskette may require a password for access, or may use encryption to secure the data within the file. Confidential documents can be delivered over a network by adding safety seals and impressions. However, the confidential data is at risk due to breaking of the passwords, encryption codes, safety seals and impressions, thereby resulting in unsecure transfer of the information.

The parent application, now U.S. Pat. No. 7,257,714, disclosed an electronic data storage medium that had fingerprint verification capability. FIG. 1 is a schematic circuit block diagram illustrating an electronic data storage medium disclosed in the parent application.

The electronic data storage medium with fingerprint verification capability can be accessed by PC motherboard 9 using input/output interface circuit 5, which may use a Personal-Computer Memory Card International Association (PCMCIA), RS-232, or similar interface to communicate. The electronic data storage medium can be located inside or outside of the external computer.

The electronic data storage medium is packaged in card body 1, and includes processing unit 2, memory device 3, fingerprint sensor 4, input/output interface circuit 5, display unit 6, power source 7, and function key set 8.

Memory device 3 can be a flash memory device that stores data files. Fingerprint sensor 4 scans a fingerprint of a user to generate fingerprint scan data. Processing unit 2 connects to other components and can operate in various modes, such as a programming mode, a data retrieving mode, and a data resetting mode. Power source 7 supplies electrical power to processing unit 2. Function key set 8 allows the user to input a password that is verified by processing unit 2. Display unit 6 shows the operating status of the electronic data storage medium.

The electronic data storage medium is packaged in card body 1, and includes processing unit 2, memory device 3, and input/output interface circuit 5. While such an electronic data storage medium is useful, manufacturing methods and product designs are desired that can be cost-effectively produced. In particular, designs for making the card body or casing that encapsulates the electronic components are desired. To reduce the cost and size, designs of the electronic data storage medium that eliminate some costly components, such as the fingerprint sensor, function key set, display, are desirable. An external power source may further reduce costs and size. Such device designs may allow a low-cost electronic data storage medium to be manufactured.

BRIEF DESCRIPTION OF THE DRAWINGS

FIG. 1 is a schematic circuit block diagram illustrating an electronic data storage medium disclosed in the parent application.

FIGS. 2A-C show an open-frame flash drive assembled using a 2-piece bracket frame.

FIG. 3A-C show the circuit-board assembly in more detail.

FIGS. 4A-C show an open-frame flash drive assembled using a U-shaped frame.

DETAILED DESCRIPTION

The present invention relates to an improvement in flash-memory drives. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have developed a variety of manufacturing methods for electronic data storage medium devices such as flash-memory drives that can replace hard disk drives with solid-state flash memory. Flash memory chips currently employ electrically-erasable programmable read-only memory (EEPROM) are the primary storage medium. Such flash memory is more rugged than rotating magnetic disks.

The card body is typically constructed with a two-piece casing that encloses a printed-circuit board assembly (PCBA)

that has a circuit board with the flash-memory chips mounted thereon. The two-piece casing can be assembled together and sealed in a variety of ways, such as with snaps, tabs and slots, ultrasonic ridges, adhesives, and screw fasteners. However, the two-piece casing seriously reduces air flow over the chips on the PCBA. The small air spaces inside the casing quickly heat up, possibly causing high thermal heating of the chips that may damage the device.

The inventors have realized that the card body may be constructed from an open frame that clips onto the PCBA. The open frame does not have a top cover or a bottom cover. Instead, the chips on the PCBA are exposed. Air may flow freely over the chips since the card body does not enclose the PCBA. Since the flash-memory drive is typically inserted into a PC, the chips are unlikely to be damaged despite being exposed.

A one or two-piece bracket forms the open frame. The bracket frame encloses only the edges of a printed-circuit board assembly (PCBA) that has a circuit board with the flash-memory chips mounted thereon. The top and bottom of the PCBA are not enclosed by the open bracket frame.

Figure 2A:
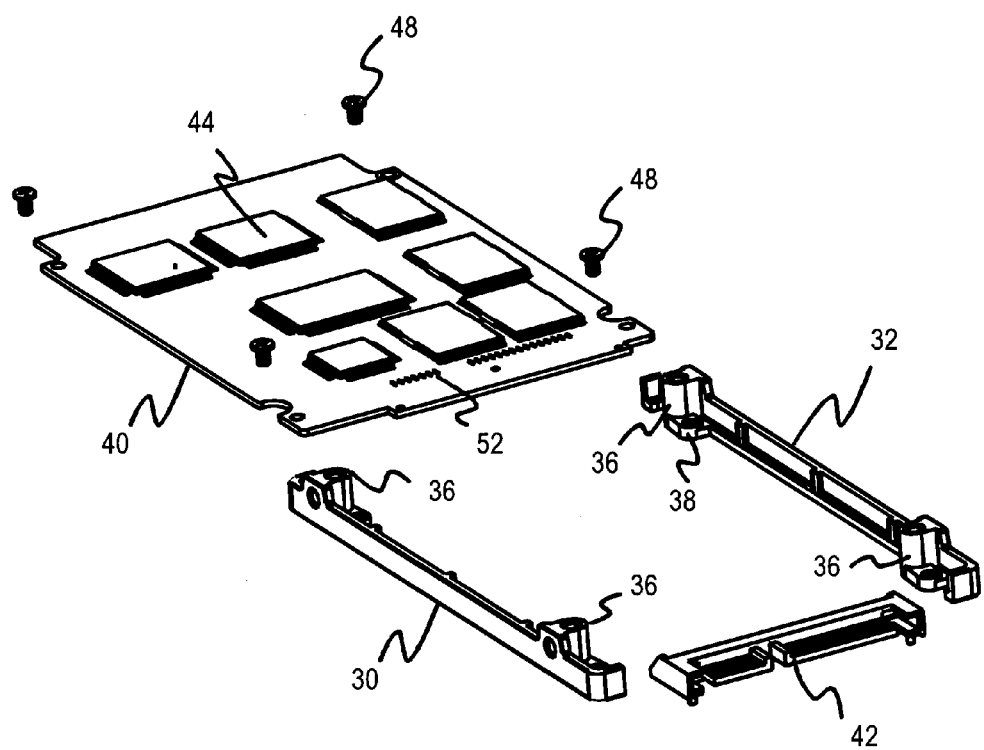

FIGS. 2A-C show an open-frame flash drive assembled using a 2-piece bracket frame. In the parts view of FIG. 2A, PCBA 40 is not enclosed by an upper case nor by a lower case. Instead, PCBA 40 is mounted to left bracket frame 30 and right bracket frame 32.

PCBA 40 is a circuit board such as a printed-circuit board (PCB) with wiring traces, and has several flash-memory chips 44 and other chips and components soldered to pads on surfaces of the circuit board. PCBA 40 has connector 42 mounted and soldered to the front edge of the circuit board. Connector 42 has pins that fit into pin-sockets of a Serial AT-Attachment (SATA) cable when the flash drive is plugged into a host.

During assembly, connector 42 is soldered to metal pads 52 on PCBA 40 before PCBA is mounted to left bracket frame 30 and right bracket frame 32. Left bracket frame 30 and right bracket frame 32 are each elongated frame brackets that have guide posts 36 at each end. Guide posts 36 fit around notches in PCBA 40 for alignment.

Left bracket frame 30 and right bracket frame 32 each also have PCBA supports 38 that are formed next to guide posts 36. The bottom surface of PCBA 40 sits on PCBA supports 38 after assembly. Screws 48 are inserted through holes in PCBA 40 and then into holes in the middle of PCBA supports 38 to secure PCBA 40 to left bracket frame 30 and right bracket frame 32.

The screw holes on PCBA 40 can have metal collars connected to the ground plane of PCBA 40 so that screws 48 are grounded. Left bracket frame 30 and right bracket frame 32 are also grounded through screws 48 when left bracket frame 30 and right bracket frame 32 are made from metal. Thus some Electrostatic Discharge (ESD) protection of flash-memory chips 44 is provided by grounding left bracket frame 30 and right bracket frame 32 through a current path that includes screws 48.

FIG. 2B shows a bottom view of the final assembled open-frame flash drive, while FIG. 2C shows a top view of the final assembled open-frame flash drive.

FIG. 2B shows a bottom view of the final assembled open-frame flash-drive device, with flash-memory chips 44 open and exposed since left bracket frame 30 and right bracket frame 32 do not enclose the bottom of PCBA 40. Connector 42 is attached to the front of PCBA 40.

FIG. 2C shows a top view of the final assembled open-frame flash-drive device. Flash-memory chips 44 are open and exposed since left bracket frame 30 and right bracket frame 32 do not enclose the top of PCBA 40. Connector 42 is attached to the front of PCBA 40. Guide posts 36 in left bracket frame 30 and in right bracket frame 32 fit around notches in PCBA 40, while screws near guide posts 36 connect PCBA 40 to PCBA supports in left bracket frame 30 and in right bracket frame 32.

Pins on connector 42 can be inserted into a socket such as on a SATA cable on a host computer, and can be read as a mass-storage device, replacing a rotating hard disk. Mass-storage devices are read in large blocks or streams of data, rather than as randomly-addressable words.

Figure 3A:
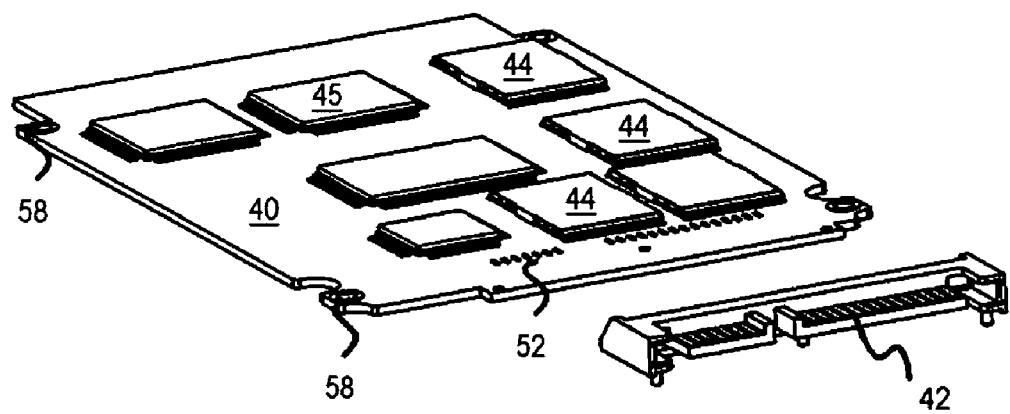

FIG. 3A-C show the circuit-board assembly in more detail. In FIG. 3A, PCBA 40 includes a circuit board with wiring traces on several layers, and vias or other inter-layer connections. Several flash-memory chips 44 are arranged on each side of the circuit board. Surface-mount technology (SMT) may be used to mount these chips and other components such as capacitors, resistors, and other chips.

Controller chip 45 is also mounted to the circuit board, for interfacing between flash-memory chips 44 and connector 42. Controller chip 45 can have a SATA or other bus interface to communicate with a host over connector 42. Controller chip 45 can also have a flash controller that reads, erases, and writes blocks of data to flash-memory chips 44, perhaps including wear-leveling and address re-mapping logic and tables.

Connector 42 is soldered to metal pads 52 on PCBA 40. Metal collars 58 are formed on PCBA 40 around holes that screws 48 (FIG. 2A) fit into.

FIG. 3B is a bottom view of the PCBA assembly while FIG. 3C is a top view of the PCBA assembly. Connector 42 is soldered to the circuit board, but left bracket frame 30 and right bracket frame 32 have not yet been attached.

Figure 4A:
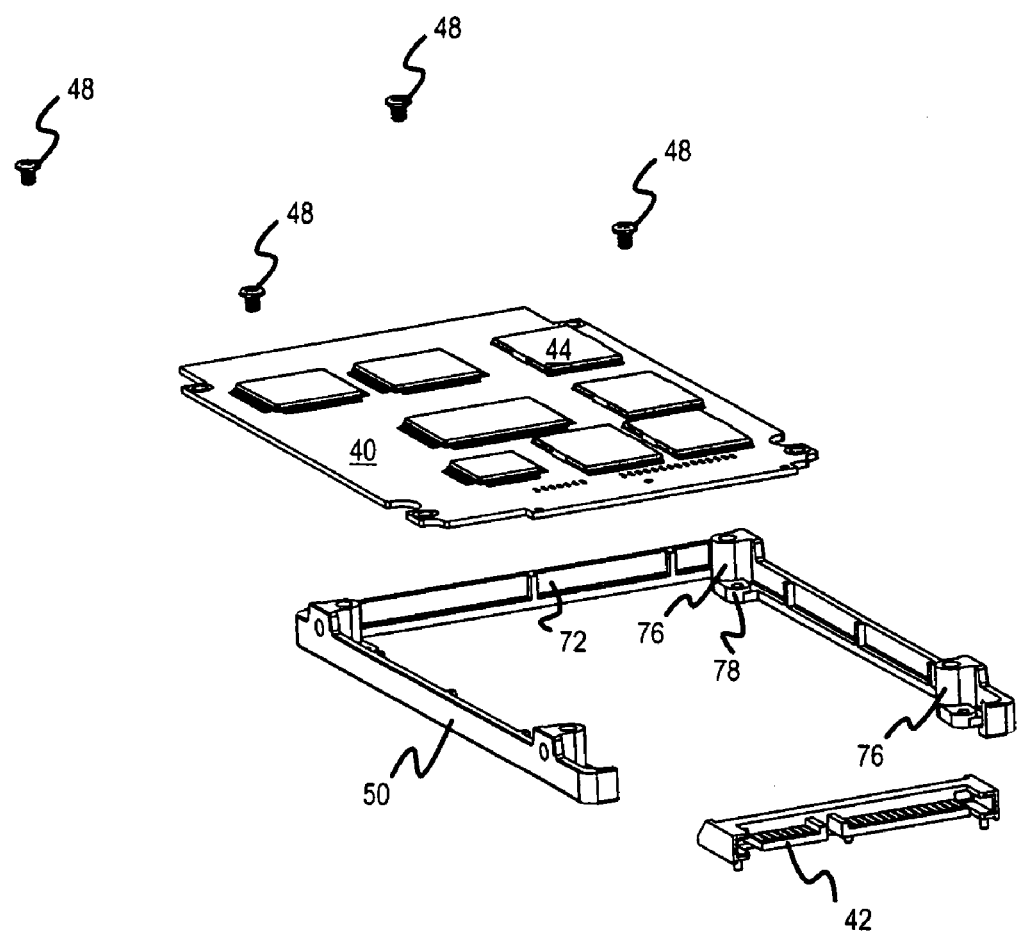

FIGS. 4A-C show an open-frame flash drive assembled using a U-shaped frame. Rather than use two bracket-frame pieces (left bracket frame 30 and right bracket frame 32 of FIG. 2A), a single piece bracket frame is used in this embodiment.

In the parts view of FIG. 4A, PCBA 40 is not enclosed by an upper case nor by a lower case. Instead, PCBA 40 is mounted to U-shaped bracket frame 50. U-shaped bracket frame 50 has back side 72 that connects between the left bracket frame and the right bracket frame portions of U-shaped bracket frame 50.

PCBA 40 is a circuit board such as a printed-circuit board (PCB) with wiring traces, and has several flash-memory chips 44 and other chips and components soldered to pads on surfaces of the circuit board. PCBA 40 has connector 42 mounted and soldered to the front edge of the circuit board. Connector 42 has pins that fit into pin-sockets of a Serial AT-Attachment (SATA) cable when the flash drive is plugged into a host.

During assembly, connector 42 is soldered to metal pads on PCBA 40 before PCBA is mounted U-shaped bracket frame 50. U-shaped bracket frame 50 has guide posts 76 at each of the four corners. Guide posts 76 fit around notches in PCBA 40 for alignment.

U-shaped bracket frame 50 also has PCBA supports 78 that are formed next to guide posts 76. The bottom surface of PCBA 40 sits on PCBA supports 78 after assembly. Screws 48 are inserted through holes in PCBA 40 and then into holes in the middle of PCBA supports 78 to secure PCBA 40 U-shaped bracket frame 50.

The screw holes on PCBA 40 can have metal collars connected to the ground plane of PCBA 40 so that screws 48 are grounded. U-shaped bracket frame 50 is also grounded through screws 48 U-shaped bracket frame 50 is made from metal. Thus some Electrostatic Discharge (ESD) protection of flash-memory chips 44 is provided by grounding U-shaped bracket frame 50 through a current path that includes screws 48.

FIG. 4B shows a bottom view of the final assembled open-frame flash drive with a U-shaped bracket frame, while FIG. 4C shows a top view of the final assembled open-frame flash drive with the U-shaped bracket frame.

FIG. 4B shows a bottom view of the final assembled open-frame flash-drive device, with flash-memory chips 44 open and exposed since U-shaped bracket frame 50 does not enclose the bottom of PCBA 40. Connector 42 is attached to the front of PCBA 40.

FIG. 4C shows a top view of the final assembled open-frame flash-drive device with the U-shaped bracket frame. Flash-memory chips 44 and controller chip 45 are open and exposed since U-shaped bracket frame 50 does not enclose the top of PCBA 40. Connector 42 is attached to the front of PCBA 40. Guide posts 76 in U-shaped bracket frame 50 fit around notches in PCBA 40, while screws near guide posts 76 connect PCBA 40 to PCBA supports in U-shaped bracket frame 50.

Pins on connector 42 can be inserted into a socket such as on a SATA cable on a host computer, and can be read as a mass-storage device, replacing a rotating hard disk. Mass-storage devices are read in large blocks or streams of data, rather than as randomly-addressable words.

Figure 5:
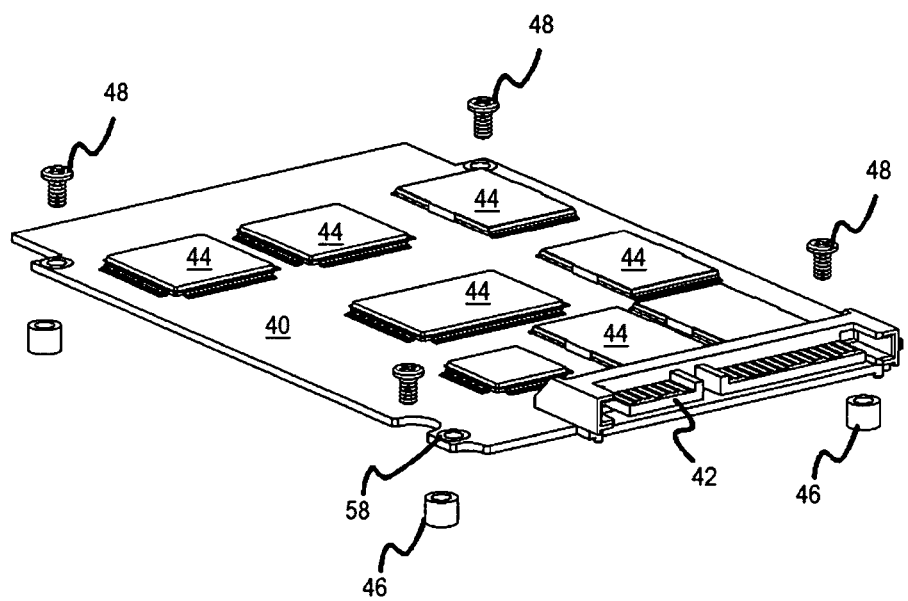
FIG. 5 shows an open flash-drive that is mountable to a motherboard using spacers.

FIG. 5 shows an open flash-drive that is mountable to a motherboard using spacers. Rather than have an open frame around PCBA 40, PCBA 40 can be mounted directly to a motherboard or other board. Connector 42 is soldered to PCBA 40 before mounting to the motherboard.

Spacers 46 are placed under holes in PCBA 40 that receive screws 48. Metal collars 58 on PCBA 40 ground screws 48 to the ground plane on PCBA 40. Spacers 46 can be separate cylinders, or may first be surface-mounted to the motherboard before PCBA 40 is attached to the motherboard by screws 48.

Figure 6:
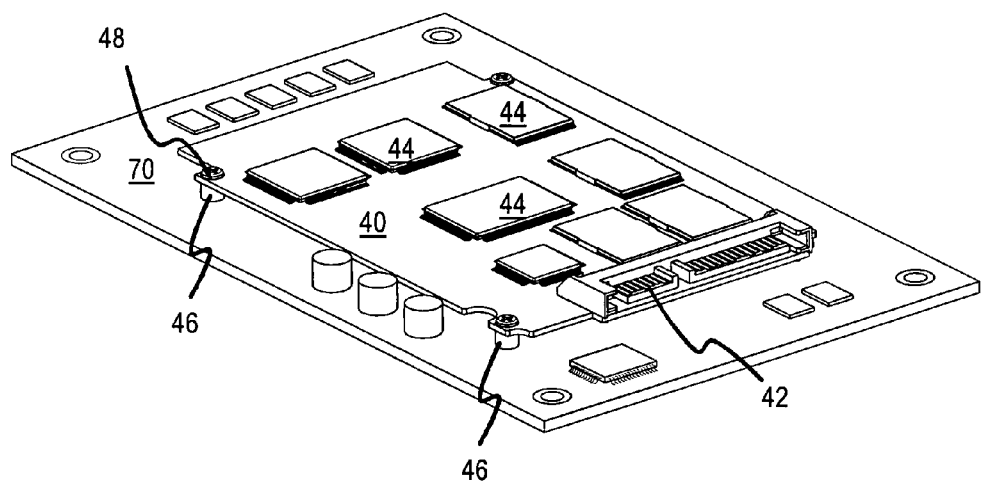
FIG. 6 shows the open flash-drive mounted to a motherboard using spacers.

FIG. 6 shows the open flash-drive mounted to a motherboard using spacers. PCBA 40 is mounted to motherboard 70 by screws 48 that fit through holes in PCBA 40 and spacers 46. Connector 42 can receive a plug from a SATA cable. The motherboard may be a PC motherboard or a board for a portable device such as a portable media player, ultra-portable PC, cell phones, handled devices, or other devices.

Figure 7:
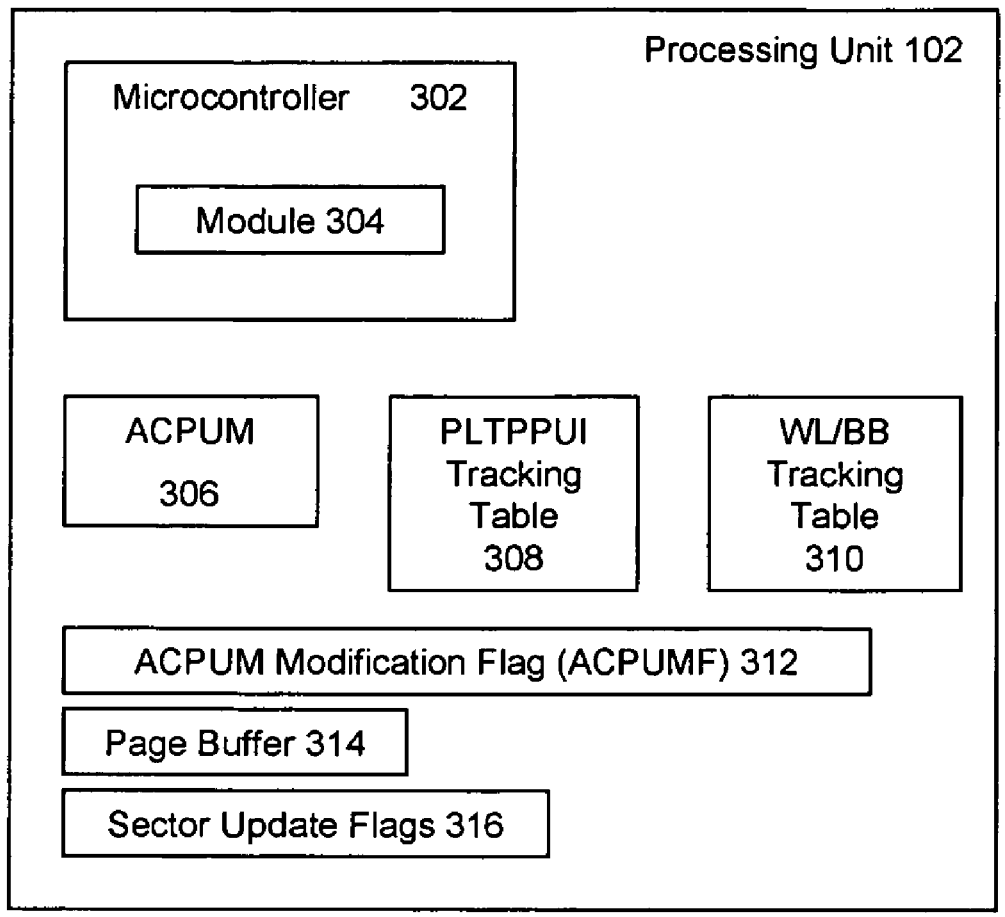
FIG. 7 is a simplified block diagram showing components of the process unit of an electronic flash memory device.

FIG. 7 is a simplified block diagram showing components of the processing unit of an electronic flash memory device. Processing unit 102 may be a flash-controller chip mounted to PCBA 40 in the earlier figures. Processing unit 102 has microcontroller or microprocessor 302, address correlation and page usage memory (ACPUM) 306, PLTPPUI tracking table 308, wear leveling and bad block (WL/BB) tracking table 310, ACPUM modification flag (ACPUMF) 312, page buffer 314 and a set of sector update flags 316.

Microcontroller 302 with flash memory controlling program module 304 (such as firmware (FW)) installed thereon is configured to control the data transfer between a host computing device (not shown) and the at least one flash memory chips 44. ACPUM 306 is configured to provide an address correlation table, which contains a plurality of entries, each representing a correlation between a partial logical block address (i.e., entries) to the corresponding physical block number.

In addition, a set of page usage flags associated with the physical block is also included in each entry. ACPUM 306 represents only one of the N sets of PLTPPUI, which is stored in the reserved area of the flash memory. In order to keep tracking the physical location (i.e., physical block number) of each of the N sets of PLTPPUI, the physical location is stored in PLTPPUI tracking table 308. Each item in PLTPPUI tracking table 308 corresponds a first special logical address to one of the N sets of PLTPPUI.

The wear leveling counters and bad block indicator for each physical block is stored in a number of physical blocks referred by corresponding second special logical addresses (e.g., '0xFFFFFF00'). WL/BB tracking table 310 is configured to store physical block numbers that are assigned or allocated for storing these physical block wear leveling counters and bad blocks. ACPUM modification flag (ACPUMF) 312 is configured to hold an indicator bit that tracks whether ACPUM 306 has been modified or not.

Page buffer 314 is configured to hold data in a data transfer request. Page buffer 314 has a size equaling to the page size of flash memory chip 44. Sector update flags 316 are configured to hold valid data flag for each of the corresponding sectors written into data area of page buffer 314. For example, four sector update flags are required for a page buffer comprising four sectors. Page buffer 314 also includes a spare area for holding other vital information such as error correction code (ECC) for ensuring data integrity of the flash memory.

Alternate Embodiments

Several other embodiments are contemplated by the inventors. The housing size and weight are drastically reduced using the open-frame housing. This low-weight compact solid-state drive is ideal for ultra-portable devices, especially when mounted directly to the device motherboard. The solid-state drive (SSD) device with the SATA connector is compact, light-weight, low-power, completely solid state, with no moving parts. Thus there is no mechanism for mechanical fatigue. Shock and vibration resistance are good. Ventilation is dramatically improved by the open-frame design, improving thermal properties. Heat-related failures are dramatically reduced. Manufacturing cost is reduced by deleting the top and bottom covers.

While a connector and controller chip for SATA has been described, other bus protocols and physical connectors could be substituted, such as small-computer system interface (SCSI), compact flash (CF), Integrated Device Electronics (IDE), PCI Express, ExpressCard, Universal-Serial-Bus (USB), etc. A zero-insertion force (ZIF) connector could also be substituted.

Combinations of plastic and metal could be used. The form factor for the flash-drive device could be designed to approximate 2.5-inch hard disk drives, or a smaller form factor for 1.8-inch, 1.3-inch, 1.0-inch, or other sizes could be substituted.

Directional terms such as upper, lower, up, down, top, bottom, etc. are relative and changeable as the device is rotated, flipped over, etc. These terms are useful for describing the device but are not intended to be absolutes. Some embodiments may have chips or other components mounted on only one side of the circuit board, while other embodiments may have components mounted on both sides.

Various combinations of the processes may be used. For example, adhesive films may be used with the screws. Alignment sockets or tabs may be added to other embodiments. Center lines or ridges may be added to stiffen U-shaped bracket frame 50. Various cosmetic features, decals, and indicia may be added.

Rather than mount packaged IC's onto the surfaces of the circuit board, unpackaged die may be mounted using die-bonding techniques. Using unpackaged die rather than packaged die may reduce the size and weight of the PCBA. Alternately, a Single Chip Non-Volatile Memory Device (NVMD) having a packaged controller and flash die in a single chip package can be used in the PCBA. (see the references CIP "Manufacturing Method for Micro-SD Memory Card", Ser. No. 12/033,854, filed Feb. 19, 2008).

Alternatively, a Single Chip Non-Volatile Memory Device (NVMD) having a packaged controller and flash die in a single chip package can be integrated either onto PCBA 40 of FIG. 6, or directly onto the motherboard to further simplify the assembly, lower the manufacturing cost and reduce the overall thickness. The single-chip NVMD may use a logical-block address (LBA) addressing scheme, having an internal controller that converts the LBA to a physical internal address of the flash cells. LBA addresses from the host are passed through a bridge chip to one or more NVMD chips on a flash bus. A data traffic controller and timing dispatcher may work in conjunction with the bridge chip to maximize bandwidth and interleaving to the NVMD chips. NVDM chips could also be used with other embodiments including the open frame cards.

Snap-tabs with movable latching teeth or extensions or locking portions may also be used in some variations. Different thicknesses and dimensions can be substituted for the examples given. The number and arrangement of chips may vary.

Various design features such as supporting underside ribs or bumps can be added. A variety of materials may be used for the connector, circuit boards, metal pads, frames, etc. Plastic or metal frames can have a variety of shapes and may partially cover different parts of the circuit board and connector, and can form part of the connector itself. Various features can have a variety of shapes and sizes. Oval, round, square, rectangular, trapezoidal, and other shapes may be used.

Rather than use the flash-drive device only for flash-memory storage, additional features may be added. For example, a music player may include a controller for playing audio from MP3 data stored in the flash memory. An audio jack may be added to the device to allow a user to plug in headphones to listen to the music. A wireless transmitter such as a BlueTooth transmitter may be added to the device to connect to wireless headphones rather than using the audio jack. Infrared transmitters such as for IrDA may also be added. A BlueTooth transceiver to a wireless mouse, PDA, keyboard, printer, digital camera, MP3 player, or other wireless device may also be added. The BlueTooth transceiver could replace the connector as the primary connector. A Bluetooth adapter device could have a connector, a RF (Radio Frequency) transceiver, a baseband controller, an antenna, a flash memory (EEPROM), a voltage regulator, a crystal, a LED (Light Emitted Diode), resistors, capacitors and inductors. These components may be mounted on the PCB before being enclosed into a plastic or metallic enclosure.

A fingerprint scanner, display, keypad, power supply, or other accessories could be added to the flash-drive device with suitable changes to the casing to allow space and user access to these devices if needed. Alternately, the flash device may delete these components and just have input/output interface circuit 5, processing unit 2, and a flash memory device in the arrangement of FIG. 1. Power may be supplied through the connector. Input/output interface circuit 5 may be integrated with processing unit 2 as controller chip 45.

An indicator lamp such as an light-emitting diode (LED) could be added to the PCBA. The open case easily allows light from the indicator lamp to be visible. A light pipe or light channel could be added.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An open-frame flash-memory drive comprising:
    a left bracket frame;
    a right bracket frame;
    a printed-circuit board assembly (PCBA) that comprises:
        a circuit board having wiring traces;
        a plurality of flash-memory chips mounted to the circuit board;
        a controller chip mounted to the circuit board, the controller chip having a input/output interface circuit for interfacing to an external computer, and a processing unit for accessing the plurality of flash-memory chips in response to commands from the external computer received by the input/output interface circuit; and
        a connector mounted to the circuit board, for connecting the controller chip to the external computer;
    wherein the left bracket frame is attached to the circuit board near a left edge of the circuit board;
    wherein the right bracket frame is attached to the circuit board near a right edge of the circuit board;
    wherein the connector is attached to the circuit board along a front edge of the circuit board between the left edge and the right edge;
    wherein the left bracket frame and the right bracket frame only partially enclose the PCBA wherein the plurality of flash-memory chips and the controller chip are open and exposed to air flow;
    wherein the plurality of flash-memory chips are block-addressable and not randomly-addressable,
    whereby the left bracket frame and the right bracket frame expose the plurality of flash-memory chips to cooling by air flow.

2. The open-frame flash-memory drive of claim 1 further comprising:
    a first conductive screw that contacts the left bracket frame and contacts ground traces on the circuit board;
    a second conductive screw that contacts the right bracket frame and contacts ground traces on the circuit board,
    wherein the ground traces connect to a chassis ground through the connector when the connector is connected to the external computer.

3. The open-frame flash-memory drive of claim 2 wherein the first conductive screw further comprises a metal collar for making electrical contact with the ground traces on the circuit board;
  wherein the second conductive screw further comprises a metal collar for making electrical contact with the ground traces on the circuit board.

4. The open-frame flash-memory drive of claim 2 wherein the left bracket frame further comprises:
  a left guide post that fits to a left notch on the circuit board;
  a left PCBA support for supporting the circuit board near the left edge;
  wherein the right bracket frame further comprises:
  a right PCBA support for supporting the circuit board near the right edge; a right guide post that fits to a right notch on the circuit board,
  whereby guide posts align to notches in the circuit board.

5. The open-frame flash-memory drive of claim 4 wherein the left bracket frame further comprises:
  a left screw hole for receiving the first conductive screw;
  wherein the right bracket frame further comprises:
  a right screw hole for receiving the second conductive screw;
  whereby the PCBA is attached by conductive screws through holes in PCBA supports on the left bracket frame and on the right bracket frame.

6. The open-frame flash-memory drive of claim 1 further comprising:
  a back frame member that connects the left bracket frame to the right bracket frame along a back edge of the circuit board;
  wherein the back frame member, the left bracket frame, and the right bracket frame together form a U-shaped bracket frame that surrounds the circuit board on three edges.

7. The open-frame flash-memory drive of claim 1 wherein the connector is a Serial AT-Attachment (SATA) connector or an integrated device electronics (IDE) connector or a small-computer system interface (SCSI) connector or a compact flash (CF), PCI Express, ExpressCard, or Universal Serial Buffer (USB) connector.

8. The open-frame flash-memory drive of claim 1 wherein the controller chip further comprises:
  a processing unit;
  an input/output interface circuit, coupled to the processing unit and configured for receiving through the connector a logical sector address (LSA) along with a data transfer request from a host computing device, the processing unit configured for extracting set, entry, page and sector numbers from the LSA using an indexing scheme.

9. The open-frame flash-memory drive of claim 8 wherein the processing unit of the controller chip further comprises:
  a page buffer;
  an address correlation page usage memory (ACPUM);
  a partial logical-to-physical address and page usage information (PLTPPUI) tracking table;
  a wear leveling counter and bad block indicator (WL/BB) tracking table; and
  wherein the plurality of flash-memory chips include a reserved area for a plurality of first physical blocks and a plurality of second physical blocks, the first physical blocks referenced by a plurality of first special logical addresses while the second physical blocks referenced by a plurality of second special logical addresses;
  wherein the plurality of first physical blocks is configured for storing the PLTPPUI tracking table and the plurality of second physical blocks for storing the WL/BB tracking table;
  wherein the ACPUM is configured to keep one set, corresponding to a set number, from the PLTPPUI tracking table;
  wherein the PLTPPUI tracking table is configured to hold correlations between the first special logical addresses and the first physical blocks;
  wherein the WL/BB tracking table is configured to hold correlations between the second special logical addresses and the second physical blocks.

10. The open-frame flash-memory drive of claim 9 wherein the ACPUM comprises a plurality of entries, each of the entries corresponding to a physical block number and page usage information of all pages of the physical block number.

11. An attachable open-frame flash-memory drive comprising:
  a printed-circuit board assembly (PCBA) that comprises:
    a circuit board having wiring traces;
    a plurality of flash-memory chips mounted to the circuit board;
    a controller chip mounted to the circuit board, the controller chip having a input/output interface circuit for interfacing to an external computer, and a processing unit for accessing the plurality of flash-memory chips in response to commands from the external computer received by the input/output interface circuit; and
    a connector mounted to the circuit board, for connecting the controller chip to the external computer;
  wherein the plurality of flash-memory chips are block-addressable and not randomly-addressable,
  a plurality of connecting screws;
  a plurality of holes in the circuit board for receiving the connecting screws;
  a plurality of spacers disposed around the connecting screws and between the circuit board and a motherboard;
  wherein the spacers provide an air gap between the circuit board and the motherboard,
  whereby the attachable open-frame flash-memory drive is screwed into the motherboard, but electrically connected by the connector.

12. The attachable open-frame flash-memory drive of claim 11 wherein the plurality of flash-memory chips comprise single-chip non-volatile memory devices (NVMD) that receive a logical block address (LBA) and internally map the LBA to a physical address.

13. The attachable open-frame flash-memory drive of claim 11 wherein the connector is a Serial AT-Attachment (SATA) connector, or an integrated device electronics (IDE) connector, or a small-computer system interface (SCSI) connector, or a compact flash (CF), PCI Express, ExpressCard, or Universal Serial Buffer (USB) connector.

14. The attachable open-frame flash-memory drive of claim 12 wherein the controller chip further comprises:
  a processing unit;
  an input/output interface circuit, coupled to the processing unit and configured for receiving through the connector a logical sector address (LSA) along with a data transfer request from a host computing device, the processing unit configured for extracting set, entry, page and sector numbers from the LSA using an indexing scheme.

15. The attachable open-frame flash-memory drive of claim 14 wherein the processing unit of the controller chip further comprises:
  a page buffer;

an address correlation page usage memory (ACPUM);
a partial logical-to-physical address and page usage information (PLTPPUI) tracking table;
a wear leveling counter and bad block indicator (WL/BB) tracking table; and
wherein the plurality of flash-memory chips include a reserved area for a plurality of first physical blocks and a plurality of second physical blocks, the first physical blocks referenced by a plurality of first special logical addresses while the second physical blocks referenced by a plurality of second special logical addresses;
wherein the plurality of first physical blocks is configured for storing the PLTPPUI tracking table and the plurality of second physical blocks for storing the WL/BB tracking table;
wherein the ACPUM is configured to keep one set, corresponding to a set number, from the PLTPPUI tracking table;
wherein the PLTPPUI tracking table is configured to hold correlations between the first special logical addresses and the first physical blocks;
wherein the WL/BB tracking table is configured to hold correlations between the second special logical addresses and the second physical blocks.

16. The attachable open-frame flash-memory drive of claim 15 wherein the ACPUM comprises a plurality of entries, each of the entries corresponding to a physical block number and page usage information of all pages of the physical block number.

17. A flash-memory device comprising:
left bracket frame means for partially encasing the flash-memory device;
right bracket frame means for partially encasing the flash-memory device;
a printed-circuit board assembly (PCBA) that comprises:
  circuit board means for connecting chips with wiring traces;
  a plurality of flash-memory chip means for storing blocks of data, the plurality of flash-memory chip means being mounted to the circuit board means, wherein the plurality of flash-memory chip means are block-addressable and not randomly-addressable;
  controller chip means, mounted to the circuit board means, for controlling access to the plurality of flash-memory chip means, the controller chip means comprising an input/output interface means for interfacing to an external computer, and processing unit means for accessing the plurality of flash-memory chip means in response to commands from the external computer received by the input/output interface means; and
  connector means, mounted to the circuit board means, for connecting the controller chip means to the external computer;
wherein the left bracket frame means is attached to the circuit board means near a left edge of the circuit board means;
wherein the right bracket frame means is attached to the circuit board means near a right edge of the circuit board means;
wherein the connector means is attached to the circuit board means along a front edge of the circuit board means between the left edge and the right edge;
wherein the left bracket frame means and the right bracket frame means only partially enclose the PCBA wherein the plurality of flash-memory chip means and the controller chip means are open and exposed to air flow;
whereby the left bracket frame means and the right bracket frame means expose the plurality of flash-memory chip means to cooling by air flow.

18. The flash-memory device of claim 17 further comprising:
back frame member means for connecting the left bracket frame means to the right bracket frame means along a back edge of the circuit board means;
wherein the back frame member means, the left bracket frame means, and the right bracket frame means together form a U-shaped bracket frame means for surrounding the circuit board means on three edges.

19. The flash-memory device of claim 18 wherein the controller chip means further comprises:
processing means for processing requests;
input/output interface circuit means, coupled to the processing means, for receiving through the connector means a logical sector address (LSA) along with a data transfer request from a host computing device, the processing means configured for extracting set, entry, page and sector numbers from the LSA using an indexing scheme.

20. The flash-memory device of claim 19 wherein the processing means of the controller chip means further comprises:
a page buffer;
an address correlation page usage memory (ACPUM);
a partial logical-to-physical address and page usage information (PLTPPUI) tracking table; and
a wear leveling counter and bad block indicator (WL/BB) tracking table;
wherein the plurality of flash-memory chip means includes a reserved area for a plurality of first physical blocks and a plurality of second physical blocks, the first physical blocks referenced by a plurality of first special logical addresses while the second physical blocks referenced by a plurality of second special logical addresses;
wherein the plurality of first physical blocks is configured for storing the PLTPPUI tracking table and the plurality of second physical blocks for storing the WL?BB tracking table;
wherein the ACPUM is configured to keep one set, corresponding to a set number, from the PLTPPUI tracking table;
wherein the PLTPPUI tracking table is configured to hold correlations between the first special logical addresses and the first physical blocks;
wherein the WL/BB tracking table is configured to hold correlations between the second special logical addresses and the second physical blocks.

* * * * *